(12) United States Patent
Monty et al.

(10) Patent No.: US 10,690,345 B2
(45) Date of Patent: Jun. 23, 2020

(54) COMBUSTOR ASSEMBLIES FOR USE IN TURBINE ENGINES AND METHODS OF ASSEMBLING SAME

(71) Applicant: General Electric Company, Schnectady, NY (US)

(72) Inventors: Joseph Douglas Monty, Boxford, MA (US); John Carl Jacobson, Melrose, MA (US); Stephen John Howell, West Newbury, MA (US)

(73) Assignee: General Electric Company, Schenectady, NY (US)

( * ) Notice: Subject to any disclaimer, the term of this patent is extended or adjusted under 35 U.S.C. 154(b) by 378 days.

(21) Appl. No.: 15/203,110

(22) Filed: Jul. 6, 2016

(65) Prior Publication Data

US 2018/0010796 A1   Jan. 11, 2018

(51) Int. Cl.
*F23R 3/00* (2006.01)
*F02C 3/04* (2006.01)
*F23R 3/54* (2006.01)
*F02C 7/18* (2006.01)

(52) U.S. Cl.
CPC ............... *F23R 3/002* (2013.01); *F02C 3/04* (2013.01); *F02C 7/18* (2013.01); *F23R 3/54* (2013.01); *F05D 2220/32* (2013.01); *F05D 2240/35* (2013.01); *F05D 2260/201* (2013.01); *F05D 2260/202* (2013.01); *F23R 2900/03042* (2013.01); *F23R 2900/03043* (2013.01); *F23R 2900/03044* (2013.01); *Y02T 50/675* (2013.01)

(58) Field of Classification Search
CPC .... F23R 3/002; F23R 3/54; F02C 3/04; F02C 7/18; F02C 7/185
See application file for complete search history.

(56) References Cited

U.S. PATENT DOCUMENTS

| 3,844,116 | A |   | 10/1974 | Matto |
|---|---|---|---|---|
| 4,573,315 | A |   | 3/1986 | Stroem |
| 4,719,748 | A | * | 1/1988 | Davis, Jr. ................ F01D 5/187 60/39.37 |
| 5,209,066 | A |   | 5/1993 | Barbier et al. |
| 5,687,572 | A | * | 11/1997 | Schrantz ................ F23R 3/007 431/352 |

(Continued)

OTHER PUBLICATIONS

International Search Report and Written Opinion issued in connection with corresponding PCT Application No. PCT/US2017/40142 dated Sep. 8, 2017.

*Primary Examiner* — Craig Kim
(74) *Attorney, Agent, or Firm* — General Electric Company; James Reed

(57) ABSTRACT

A combustor assembly for use in a gas turbine engine includes a combustor liner that defines a combustion chamber and includes an axial combustion portion and a curved transition portion. The combustion liner also includes an inner surface and an outer surface and a first plurality of cooling channels defined between the inner and outer surfaces. The combustor assembly also includes a sleeve substantially circumscribing the combustor liner such that an annular cavity is defined between the combustor liner and the sleeve. The sleeve includes a second plurality of cooling channels defined therethrough that are configured to channel a fluid against the combustor liner outer surface.

14 Claims, 3 Drawing Sheets

(56) References Cited

U.S. PATENT DOCUMENTS

| | | | | |
|---|---|---|---|---|
| 5,758,504 A | * | 6/1998 | Abreu | F23R 3/002 60/754 |
| 7,036,316 B2 | * | 5/2006 | Howell | F23R 3/002 60/754 |
| 8,353,165 B2 | | 1/2013 | McMahan et al. | |
| 8,646,276 B2 | * | 2/2014 | Davis, Jr. | F23R 3/005 60/752 |
| 8,864,492 B2 | | 10/2014 | Shi et al. | |
| 9,080,770 B2 | | 7/2015 | Dudebout et al. | |
| 9,976,487 B2 | * | 5/2018 | Hughes | F02C 7/222 |
| 2002/0116929 A1 | * | 8/2002 | Snyder | F23R 3/002 60/740 |
| 2004/0211188 A1 | | 10/2004 | Alkabie | |
| 2007/0227150 A1 | * | 10/2007 | Alkabie | F23R 3/04 60/754 |
| 2011/0107766 A1 | * | 5/2011 | Davis, Jr. | F23R 3/005 60/755 |
| 2011/0120134 A1 | | 5/2011 | Hoke et al. | |
| 2012/0304647 A1 | * | 12/2012 | Dudebout | F23R 3/06 60/732 |
| 2013/0086921 A1 | * | 4/2013 | Matthews | F23R 3/005 60/782 |
| 2014/0311152 A1 | | 10/2014 | Prociw et al. | |
| 2014/0360195 A1 | | 12/2014 | Beran et al. | |
| 2015/0198335 A1 | | 7/2015 | Kim et al. | |
| 2015/0377134 A1 | * | 12/2015 | Maurer | F02C 7/18 60/754 |

\* cited by examiner

COMBUSTOR ASSEMBLIES FOR USE IN TURBINE ENGINES AND METHODS OF ASSEMBLING SAME

BACKGROUND

The field of the present disclosure relates generally to turbine engines and, more particularly, to combustor assemblies for use in turbine engines.

In a gas turbine engine, air pressurized in a compressor is mixed with fuel in a combustor to generate hot combustion gases. Energy is initially extracted from the gases in a high pressure turbine (HPT) that powers the compressor, and subsequently in a low pressure turbine (LPT) that powers a fan in a turbofan aircraft engine application, or powers a propeller via a gearbox in a turboprop aircraft application, or powers a rotor via a gearbox in a turboshaft helicopter application, or powers an external shaft for marine and/or industrial applications. Generally, engine efficiency increases as the temperature of combustion gases is increased. However, the increased gas temperature increases the operating temperature of various components along the gas flowpath, which in turn increases the need for cooling such components to facilitate extending their useful life.

For example, known combustors include an annular combustion liner that requires cooling during operation of the gas turbine engine. Furthermore, known reverse flow combustors used in gas turbine engines generally include a large surface area that requires additional cooling. At least some gas turbine engines use compact axial through flow combustors to reduce the amount of surface area requiring cooling. However, at least some known gas turbine engines have a limited amount of axial space between the compressor and the HPT. In such configurations, axial through flow combustors may not fit in the allotted space, thus requiring the use of a reverse flow combustor having a reduced surface area and sufficient cooling features.

BRIEF DESCRIPTION

In one embodiment, a reverse flow combustor assembly for use in a gas turbine engine is provided. The combustor assembly includes a combustor liner that defines a combustion chamber and includes an axial combustion portion and a curved transition portion. The combustion liner also includes an inner surface and an outer surface and a first plurality of cooling channels defined between the inner and outer surfaces. The combustor assembly also includes a sleeve substantially circumscribing the combustor liner such that an annular cavity is defined between the combustor liner and the sleeve. The sleeve includes a second plurality of cooling channels defined therethrough that are configured to channel a fluid against the combustor liner outer surface.

In another embodiment, a turbine engine is provided. The turbine engine includes a compressor and a combustor coupled in flow communication with the compressor. The combustor includes at least one reverse flow combustor assembly that includes a combustor liner defining a combustion chamber and including an axial combustion portion and a curved transition portion. The combustion liner also includes an inner surface and an outer surface and a first plurality of cooling channels defined between the inner and outer surfaces. The combustor assembly also includes a sleeve substantially circumscribing the combustor liner such that an annular cavity is defined between the combustor liner and the sleeve. The sleeve includes a second plurality of cooling channels defined therethrough that are configured to channel a fluid against the combustor liner outer surface.

In yet another embodiment, a method of manufacturing a reverse flow combustor assembly for use in a gas turbine engine is provided. The method includes forming a first plurality of cooling channels between an inner surface and an outer surface of a combustor liner. The combustor liner defines a combustion chamber and includes an axial combustion portion and a curved transition portion. The method also includes forming a second plurality of cooling channels through a sleeve, and coupling the sleeve to the combustor liner such that the sleeve substantially circumscribes the combustor liner to define an annular cavity between the combustor liner and the sleeve. The second plurality of cooling channels are configured to channel a fluid against the combustor liner outer surface.

DETAILED DESCRIPTION

Figure 1:
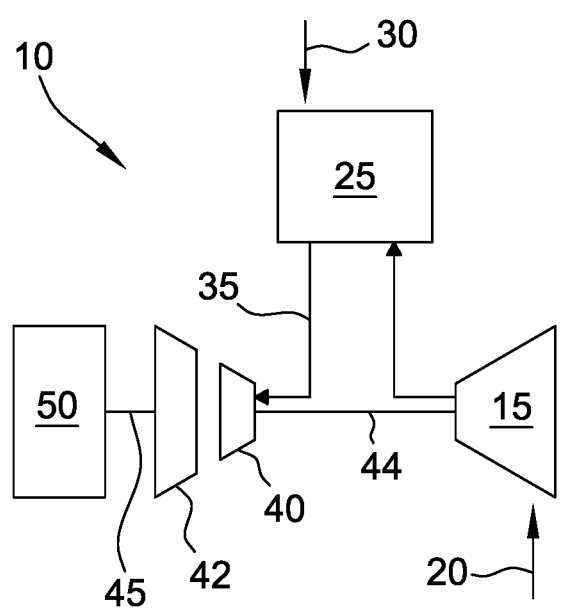
FIG. 1 is a schematic diagram of an exemplary turbine engine.

In the following specification and the claims, reference will be made to a number of terms, which shall be defined to have the following meanings. The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, unless otherwise indicated, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to a combustor assembly that may be used with turbine engines to substantially cool a combustor liner and, in particular, substantially cool a reverse flow combustor assembly. More specifically, the embodiments described herein provide a combustor liner that defines a combustion chamber and includes an axial combustion portion and a curved transition portion. The combustion liner also includes an inner surface and an outer surface and a first plurality of cooling channels defined between the inner and outer surfaces. The combustor assembly also includes a sleeve substantially circumscribing the combustor liner such that an annular cavity is defined between the combustor liner and the sleeve. The sleeve includes a second plurality of cooling channels defined therethrough that are configured to channel a fluid against the combustor liner outer surface.

Accordingly, the combustor assembly describes fully enveloped, double wall, impingement cooled multi-hole liners and sleeves to provide impingement cooling and is enabled to effectively cool the combustor liner as compared to known reverse flow combustor assemblies. Additionally, the combustor assembly described herein includes a partition that forms two separate cooling zones with differential pressure to optimize cooling. Moreover, by effectively cooling the combustor liner, thermal distress such as burn-through or cracking, thermal differential stresses, and/or damage to the combustor liner may be substantially reduced and/or prevented.

Referring now to the drawings, in which like numerals refer to the same elements throughout the several views, FIG. 1 is a schematic diagram of a turbine engine 10. In the exemplary embodiment, turbine engine 10 is a reverse flow gas turbine engine. While the exemplary embodiment illustrates a reverse flow gas turbine engine, the present disclosure is not limited to such an engine, and one of ordinary skill in the art will appreciate that the current disclosure may be used in connection with other turbine engines, such as, but not limited to, conventional flow turbine engines.

In the exemplary embodiment, gas turbine engine 10 includes a compressor 15. Compressor 15 compresses an incoming flow of air 20 and delivers a compressed flow of air 20 to a combustor assembly 25. Combustor assembly 25 mixes air 20 with a pressurized flow of fuel 30 and ignites the combined mixture to create a flow of hot combustion gases 35. The flow of the hot combustion gases 35 is in turn channeled to a high pressure turbine 40 and a low pressure turbine 42. The flow of hot combustion gases 35 drive turbines 40 and 42 so as to produce mechanical work. In the exemplary embodiment, mechanical work produced in turbine 40 drives compressor 15 via a first shaft 44, and turbine 42 drives an external load 50, such as an electrical generator, a propeller, a rotor, or a fan via a second shaft 45.

Figure 2:
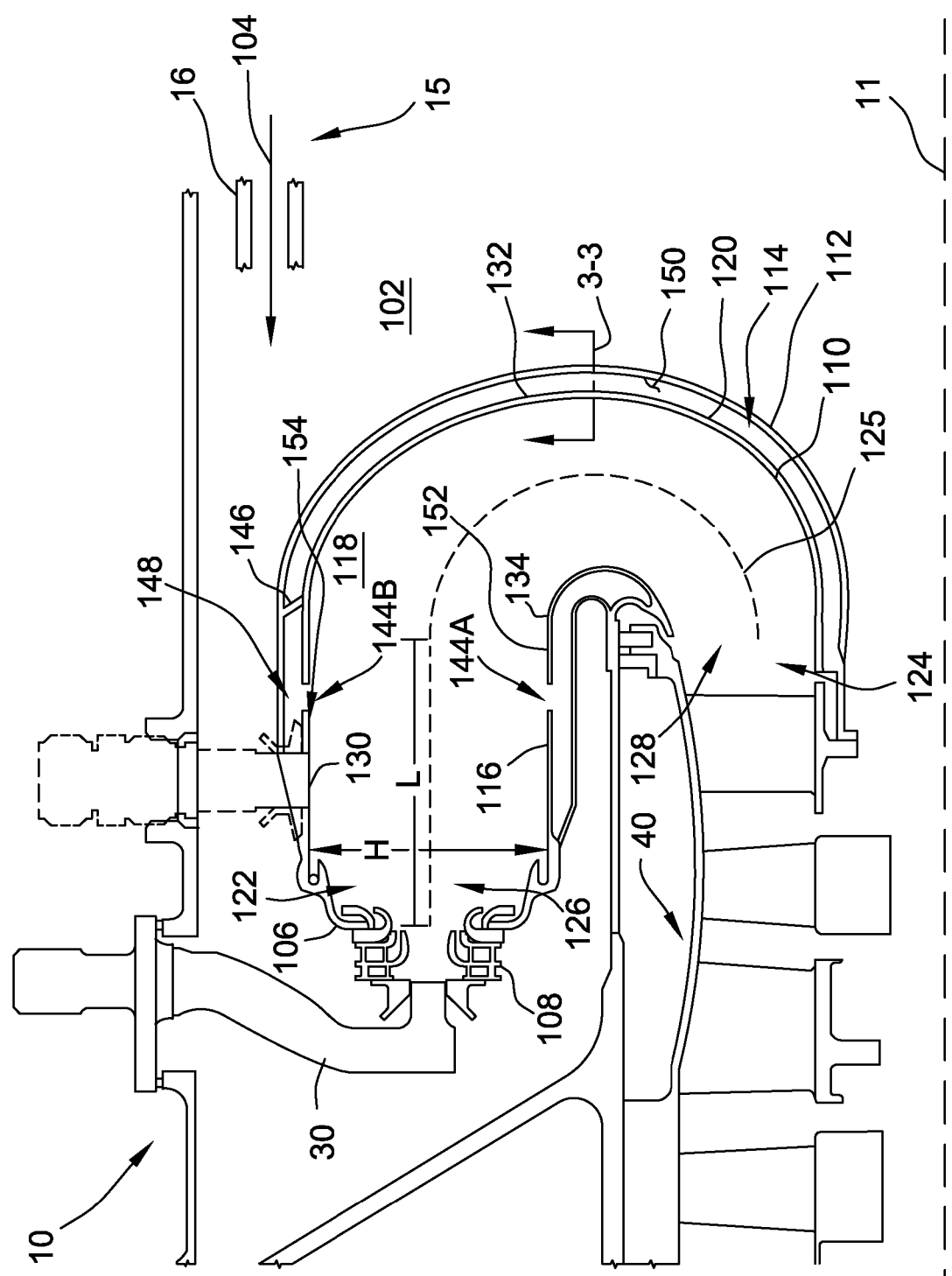
FIG. 2 is an enlarged cross-sectional view of a portion of an exemplary combustor assembly that may be used with the turbine engine shown in FIG. 1.
Figure 3:
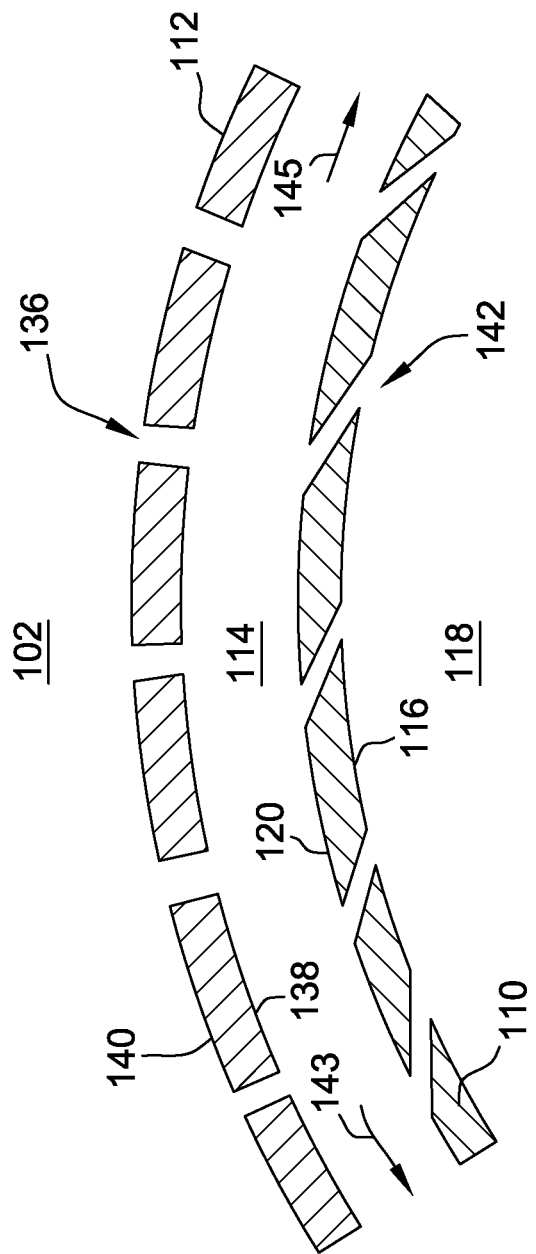
FIG. 3 is an enlarged cross sectional view of a portion of the combustor assembly shown in FIG. 2 and taken at a curved transition portion of the combustor assembly.

FIG. 2 is an enlarged cross-sectional view of a portion of an exemplary combustor assembly 100. FIG. 3 is an enlarged cross sectional view of a portion of combustor assembly 100 shown in FIG. 2 and taken at a curved transition portion. In the exemplary embodiment, combustor assembly 100 is used on gas turbine engine 10 and is substantially similar to combustor assembly 25. In the exemplary embodiment, combustor assembly 100 is coupled in flow communication with turbines 40 and 42 and with compressor section 15. Moreover, in the exemplary embodiment, compressor section 15 includes an outlet 16 that is coupled in flow communication with a discharge cavity 102. Cavity 102 directs a flow of air 104 downstream from compressor section 15 towards combustor assembly 100.

In the exemplary embodiment, combustor assembly 100 includes a substantially annular dome plate 106 that at least partially supports a plurality of air swirlers 108, which are supplied a fuel flow by a corresponding plurality of fuel nozzles 30. Combustor assembly 100 also includes a combustor liner 110 coupled to dome 106 and an impingement sleeve 112 coupled to and substantially circumscribing liner 110. More specifically, in the exemplary embodiment, impingement sleeve 112 is coupled radially away from combustor liner 110 such that a cavity or annular cooling passage 114 is defined between impingement sleeve 112 and combustor liner 110.

In the exemplary embodiment, combustor liner 110 includes an inner surface 116 that defines an annular combustion chamber 118 and an outer surface 120 that at least partially defines cooling passage 114. Combustion liner 110 also includes an inlet 122 proximate swirlers 108 and an outlet 124 proximate turbine section 40 that define a curved length therebetween extending along a centerline 125 of combustion chamber 118. Similarly, sleeve 112 includes an inlet 126 proximate swirlers 108 and an outlet 128 proximate turbine section 40 that define a curved length therebetween. The lengths of liner 110 and sleeve 112 are substantially similar such that sleeve 112 extends a complete distance of liner 110 to form a fully enveloped, double wall combustor assembly 100.

Liner 110 also a combustor portion 130 and a transition portion 132. In the exemplary embodiment, combustor portion 130 is a substantially cylindrical portion of liner 110 that is axially oriented with respect to a centerline 11 of engine 10. Transition portion 132 is a curved, or more specifically, a substantially toroidal-shaped, portion of liner 110 positioned downstream from combustor portion 130. In the exemplary embodiment, fuel 30 mixes with air and ignites within combustor portion to form hot combustion gas, which are then channeled downstream through transition portion 132 to turbine 40. As described herein, liner 110 is designed to have the lowest surface area possible while still satisfying specifications. More specifically, combustor portion 130 includes a minimum axial length L extending between dome 106 and a transition point 134 that enables efficient combustion of fuel 30, but that also enables combustor portion 130 to have a minimum surface area that will require cooling. Similarly, combustor portion 130 includes a radial height H between a radially inner portion of liner 110 and a radially outer portion of liner 110. In the exemplary embodiment, the axial length L of combustor portion 130 is approximately 1.0 to 2.5 times the radial height H of combustor portion 130 such that combustor portion 130 requires only minimum cooling. More specifically, the axial length L of combustor portion 130 is approximately 1.2 times the radial height H of combustor portion 130.

In the exemplary embodiment, sleeve 112 includes a plurality of cooling channels 136 defined therethrough. Channels 136 facilitate channeling a portion of compressor bleed air 104 from cavity 102 through sleeve 112 and into cooling passage 114. In one embodiment, channels 136 are substantially perpendicular to an inner surface 138 and an outer surface 140 of sleeve 112. Alternatively, channels 136 include any orientation through sleeve 112 with respect to surfaces 138 and 140 to provide impingement cooling to liner 110. Furthermore, channels 136 are circumferentially-spaced about sleeve 112 such that channels 136 form a plurality of rows along the length of sleeve 112. Generally, channels 136 include any orientation and configuration that facilitates operation of sleeve 112 as described herein.

Similarly, liner 110 includes a plurality of cooling channels 142 defined therethrough between inner surface 116 and outer surface 120. Channels 142 facilitate channeling at least a portion of compressor bleed air 104 from within cooling passage 114 through liner 110 and into combustion chamber 118. In the exemplary embodiment, channels 142 are oriented obliquely with respect to surfaces 116 and 120 such that, as the air exits channels 142 into chamber 118, the air forms a film on inner surface 116. As such, channels 142 facilitate providing cooling to liner 110. Furthermore, channels 142 are circumferentially-spaced about liner 110 such that channels 142 form a plurality of rows along the length of liner 110. Generally, channels 142 include any orientation and configuration that facilitates operation of liner 110 as described herein, but in the preferred embodiment are oriented to direct air in the general direction of the main flow in chamber 118.

During operation, compressor section 15 is driven by turbine section 40 via shaft 44 (shown in FIG. 1). As compressor section 15 rotates, compressed air 104 is discharged into cavity 102 for use in cooling turbine engine 10 components. More specifically, air 104 flows through sleeve 112 via channels 136 into cooling passage 114 such that air 104 impinges against outer surface 120 of liner 110 to facilitate cooling liner 110. After impingement, air 104 within cooling passage 114 is deflected and dispersed substantially within passage 114 in both a first direction 143 and a different second direction 145 (shown in FIG. 3) along outer surface 120 to provide cooling and/or pressure balancing. As air 104 travels along outer surface 120, at least a portion of the air 104 flows through channels 142 in liner 110 and into combustion chamber 118. As described above, channel 142 are oriented obliquely through liner 110 to provide bore convection cooling of liner 110 and such that air 104 forms a thin film on inner surface 116 to cool inner surface 116 from the hot combustion gases within chamber 118.

Combustor liner 110 is formed from a high-temperature tolerant metal, such as, but not limited to, a nickel chromium alloy. In another embodiment, efficient cooling of liner 110 as described herein enables the use of lower heat tolerance materials, which reduces component costs. Sleeve 112 is formed from the same metal as liner 110. In another embodiment, sleeve 112 is formed from a different metal with a lower heat tolerance since sleeve 112 is not exposed to the combustion gases. Generally, liner 110 and sleeve 112 are formed from any metal that facilitates operation of combustor assembly 100 as described herein.

In the exemplary embodiment, combustor liner 110 includes a radially inner portion 152 including a plurality of dilution openings 144a and a radially outer portion 154 including a plurality of dilution openings 144b. More specifically, dilution openings 144a and 144b are formed in combustor portion 130 of liner 110. In the exemplary embodiment, liner 110 includes a single row of dilution openings 144a and 144b. Alternatively, liner 110 includes any number of rows and any pattern of dilution openings 144a and 144b to facilitate operation of combustor assembly 100 as described herein. Dilution openings 144a and 144b are axially aligned with each other and are circumferentially-spaced about a portion of combustor portion 130. More specifically, dilution openings 144a on inner portion 152 are circumferentially offset from dilution openings 144b on outer portion 154 such that dilution openings 144a and 144b do not oppose each other so as not to interfere with the airflow flowing therefrom. In the exemplary embodiment, compressed air is supplied to dilution openings 144a and 144b from cooling passage 114 and is channeled through dilution openings 144a and 144b to both complete the combustion reaction and also to adjust the temperature signature of the resultant combustion gases.

In the exemplary embodiment, combustor assembly 100 also includes a partition 146 positioned within cooling passage 114 radially between liner 110 and sleeve 112 and axially between combustor portion 130 and transition portion 132. In one embodiment, partition 146 is integrally formed with one of liner 110 and sleeve 112. In another embodiment, partition 146 is a separate component coupled within cooling passage 114. Furthermore, in the exemplary embodiment, partition 146 extends circumferentially about an entirety of liner 110. More specifically, partition 146 extends radially within an entirety of cooling passage 114. Alternatively, partition 146 may extend only about a radial portion of liner 110, or about a circumferential portion of liner 110.

As described above, partition 146 is positioned axially between combustor portion 130 and transition portion 132. As such, partition 146 defines a first cooling zone 148 within cooling passage 114 upstream of partition 146 and a second cooling zone 150 within cooling passage 114 downstream of partition 146. First cooling zone 148 is associated with the portion of cooling passage 114 that surrounds combustor portion 130, and second cooling zone 150 is associated with the portion of cooling passage 114 that surrounds transition portion 132.

In the exemplary embodiment, partition 146 prevents at least a portion of the flow of cooling air 104 within first cooling zone 148 from traveling downstream to second cooling zone 150. Furthermore, as described above, the portion of cooling passage 114 outside combustor portion 130, that is, first cooling zone 148, is supplied additional compressed air. As such, the hindrance of partition 146 not allowing air to flow from first cooling zone 148 to second cooling zone 150 causes a differential pressure between first and second cooling zones 148 and 150. More specifically, first cooling zone 148 includes a first pressure of cooling air 104 therein, and second cooling zone 150 includes a second pressure of cooling air 104 therein that is different from, and lower than, the pressure of cooling air 104 within first cooling zone 148.

The above-described combustor assembly may be used with turbine engines to substantially cool a combustor liner and, in particular, substantially cool a reverse flow combustor assembly. More specifically, the embodiments described herein provide a combustor liner that defines a combustion chamber and includes an axial combustion portion and a curved transition portion. The combustion liner also includes an inner surface and an outer surface and a first plurality of cooling channels defined between the inner and outer surfaces. The combustor assembly also includes a sleeve substantially circumscribing the combustor liner such that an annular cavity is defined between the combustor liner and the sleeve. The sleeve includes a second plurality of cooling channels defined therethrough that are configured to channel a fluid against the combustor liner outer surface.

Accordingly, the combustor assembly describes fully enveloped, double wall, impingement cooled multi-hole liners and sleeves and is enabled to effectively cool the combustor liner as compared to known reverse flow combustor assemblies. Additionally, the combustor assembly described herein includes a partition that forms two separate cooling zones with differential pressure to optimize cooling. Moreover, by effectively cooling the combustor liner, thermal distress such as burnthrough or cracking, thermal differential stresses, and/or damage to the combustor liner may be substantially reduced and/or prevented.

Exemplary embodiments of a combustor assembly and method of assembling same are described above in detail. The combustor assembly and method of assembling same are not limited to the specific embodiments described herein, but rather, components of the combustor assembly and/or steps of the combustor assembly may be utilized independently and separately from other components and/or steps described herein. For example, the combustor assembly may also be used in combination with other machines and methods, and is not limited to practice with only a turbine engine as described herein. Rather, the exemplary embodiment can be implemented and utilized in connection with many other systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A reverse flow combustor assembly for use in a gas turbine engine, the combustor assembly comprising:
   a combustor liner defining a combustion chamber and comprising an axial combustion portion and a curved transition portion, the curved transition portion positioned between an inlet and outlet of the combustor liner such that the inlet and outlet are spaced-apart along a curved centerline, wherein the combustor liner comprises an inner surface and an outer surface and a first plurality of cooling channels defined between the inner and outer surfaces; and
   a sleeve substantially circumscribing the combustor liner such that an annular cavity is defined between the combustor liner and the sleeve, wherein the sleeve comprises a second plurality of cooling channels defined therethrough, the second plurality of cooling channels configured to channel a fluid against the combustor liner outer surface;
   a single solid partition positioned within the cavity between the combustor liner and the sleeve, the partition being positioned axially between the axial combustion portion and the transition portion such that the partition extends circumferentially about an entirety of the combustor liner within the cavity to define a first cooling zone within the cavity upstream of the partition and a second cooling zone within the cavity downstream of the partition, the partition causing a differential pressure between the first and the second cooling zones.

2. The combustor assembly in accordance with claim 1, wherein the inlet and an outlet of the combustor define a first length therebetween, and wherein the sleeve comprises an inlet and an outlet that define a second length therebetween that is substantially equal to the first length.

3. The combustor assembly in accordance with claim 1, wherein the axial combustion portion comprises a plurality of dilution openings defined therethrough.

4. The combustor assembly in accordance with claim 1, wherein the first plurality of cooling channels are oriented obliquely with respect to the combustor liner inner and outer surfaces.

5. The combustor assembly in accordance with claim 4, wherein the second plurality of cooling channels are oriented perpendicular to the sleeve.

6. The combustor assembly in accordance with claim 1, wherein the partition is integral with the sleeve.

7. A turbine engine comprising:
   a compressor; and
   a reverse flow combustor coupled in flow communication with the compressor, the combustor comprising at least one combustor assembly comprising:
      a combustor liner defining a combustion chamber and comprising an axial combustion portion and a curved transition portion, the curved transition portion positioned between an inlet and outlet of the combustor liner such that the inlet and outlet are spaced-apart along a curved centerline, wherein the combustor liner comprises an inner surface and an outer surface and a first plurality of cooling channels defined between the inner and outer surfaces; and
      a sleeve substantially circumscribing the combustor liner such that an annular cavity is defined between the combustor liner and the sleeve, wherein the sleeve comprises a second plurality of cooling channels defined therethrough, the second plurality of cooling channels configured to channel a fluid against the combustor liner outer surface;
      a single solid partition positioned within the cavity between the combustor liner and the sleeve, the partition being positioned axially between the axial combustion portion and the transition portion such that the partition extends circumferentially about an entirety of the combustor liner within the cavity to define a first cooling zone within the cavity upstream of the partition and a second cooling zone within the cavity downstream of the partition, wherein the partition prevents cooling air within the first cooling zone from traveling downstream to the second cooling zone thereby causing a differential pressure between the first and the second cooling zones.

8. The turbine engine in accordance with claim 7, wherein the inlet and an outlet of the combustor define a first length therebetween, and wherein the sleeve comprises an inlet and an outlet that define a second length therebetween that is substantially equal to the first length.

9. The turbine engine in accordance with claim 7, wherein the axial combustion portion comprises a radially inner portion having a first plurality of circumferentially-spaced dilution openings defined therethrough and a radially outer portion comprising a second plurality of circumferentially-spaced dilution openings defined therethrough.

10. The turbine engine in accordance with claim 9, wherein the first plurality of dilution openings are circumferentially offset with and are axially aligned with the second plurality of dilution openings.

11. The turbine engine in accordance with claim 7, wherein the first plurality of cooling channels are oriented obliquely with respect to the combustor liner inner and outer surfaces, and wherein the second plurality of cooling channels are oriented perpendicular to the sleeve.

12. A method of manufacturing a reverse flow combustor assembly for use in a gas turbine engine, the method comprising:

forming a first plurality of cooling channels between an inner surface and an outer surface of a combustor liner, wherein the combustor liner defines a combustion chamber and includes an axial combustion portion and a curved transition portion, the curved transition portion positioned between an inlet and outlet of the combustor liner such that the inlet and outlet are spaced-apart along a curved centerline;

forming a second plurality of cooling channels through a sleeve; and coupling the sleeve to the combustor liner such that the sleeve substantially circumscribes the combustor liner to define an annular cavity between the combustor liner and the sleeve, wherein the second plurality of cooling channels configured to channel a fluid against the combustor liner outer surface;

coupling a single solid partition within the cavity between the combustor liner and the sleeve axially between the axial combustion portion and the transition portion such that the partition extends circumferentially about an entirety of the combustor liner within the cavity to define a first cooling zone within the cavity upstream of the partition and a second cooling zone within the cavity downstream of the partition, wherein the partition causes a differential pressure between the first and the second cooling zones.

13. The method in accordance with claim 12, wherein coupling the sleeve to the combustor liner comprises coupling the sleeve to the combustor liner such that the sleeve extends an entire length of the combustor liner.

14. The combustor assembly in accordance with claim 1, wherein the fluid is deflected and dispersed within the annular cavity in both a first direction and a different second direction along the outer surface of the combustor liner.

* * * * *